United States Patent [19]

Takahashi et al.

[11] Patent Number: 4,780,353

[45] Date of Patent: Oct. 25, 1988

[54] MAGNETIC RECORDING MEDIUM

[75] Inventors: Masatoshi Takahashi; Chiaki Mizuno; Hiroshi Ogawa; Yasuo Tamai; Noburo Hibino, all of Kanagawa, Japan

[73] Assignee: Fuji Photo Film Co., Ltd., Kanagawa, Japan

[21] Appl. No.: 83,896

[22] Filed: Aug. 6, 1987

Related U.S. Application Data

[63] Continuation of Ser. No. 692,806, Jan. 18, 1985, abandoned.

[30] Foreign Application Priority Data

Jan. 24, 1984 [JP] Japan ................................ 59-8241

[51] Int. Cl.$^4$ .............................................. G11B 5/70
[52] U.S. Cl. ..................................... 428/141; 427/128; 428/323; 428/328; 428/694; 428/480; 428/900
[58] Field of Search ............... 428/694, 695, 900, 323, 428/328, 141, 480; 427/128; 360/134

[56] References Cited

U.S. PATENT DOCUMENTS

| 4,071,654 | 1/1978 | Ogawa et al. | 428/694 |
| 4,275,107 | 6/1981 | Bartkus et al. | 428/220 |
| 4,316,927 | 2/1982 | Kimura et al. | 428/694 |
| 4,337,288 | 6/1982 | Takenaka et al. | 428/694 |
| 4,481,231 | 11/1984 | Hashimoto et al. | 427/128 |
| 4,496,626 | 1/1985 | Kasuga et al. | 427/128 |
| 4,497,865 | 2/1985 | Minami et al. | 428/694 |
| 4,548,833 | 10/1985 | Hashimoto et al. | 428/900 |
| 4,613,545 | 9/1986 | Chubachi et al. | 428/694 |

*Primary Examiner*—Paul J. Thibodeau
*Attorney, Agent, or Firm*—Sughrue, Mion, Zinn, Macpeak & Seas

[57] ABSTRACT

A magnetic recording medium comprising a flexible support having coated thereon a magnetic layer is disclosed. The support has a surface roughness of from 0.01 to 0.1 μm, the magnetic recording medium has a percent heat shrinkage of 1% or less in the direction of maximum shrinkage thereof after standing at 110° C. for 4 hours, and the magnetic layer contains a metal or alloy fine powder as a ferromagnetic powder. The magnetic recording medium has a excellent running property after repeated use and a small percent heat shrinkage.

17 Claims, No Drawings

MAGNETIC RECORDING MEDIUM

This is a continuation of application Ser. No. 06/692,806 filed Jan. 18, 1985 now abandoned.

FIELD OF THE INVENTION

This invention relates to a magnetic recording medium, and more particularly to a magnetic recording medium having excellent running properties and a small percent heat shrinkage even after repeated use.

BACKGROUND OF THE INVENTION

Magnetic recording media, such as audio tapes and video tapes loaded in cassettes, have conventionally been used or stored in environments undergoing only mild changes in temperature, such as the interior of a room. However, with the recent spread of radio cassettes, automobile stereos, small-sized video type recorders, and the like, magnetic recording media have been required to withstand use or storage in high temperature or low temperature environments such as the exterior of a room or the interior of automobiles. For example, according to the method of testing automobile parts in high temperatures and low temperatures (JIS D0204), it is reported that the maximum day time temperature in the interior of automobiles can reach as high as 104° C. in summer.

Upon exposure to such a high temperature, the conventional magnetic recording media shrinks, resulting in curling, arching deformation in the longitudinal direction due to unbalanced shrinkage of both edges, and/or squeeze of tapes to cause deformation of hubs or extrusion of hubs. Therefore, if a magnetic recording medium having recorded thereon, for example, music, is exposed to high temperatures, the output level during reproduction widely varies, and not only fails to normally reproduce the music, but also running disorders occur. Particularly in the case of magnetic recording media using a thin support for long-time recording, such as audio compact cassettes, e.g., C-80, C-90, C-120, etc., the length of the magnetic tape loaded in a cassette half increases, and the number of winding times around the hubs also increases so that the above-described problems become noticeable.

Conventionally employed supports for magnetic recording media include stretched and crystallized polyester films, especially those mechanically reinforced in their longitudinal direction by stretching in the longitudinal direction at a high stretching ratio. The inventors have conducted extensive investigations to determine the reasons why the magnetic recording media using these supports are unsatisfactory when used at high temperatures. As a result, it was found that the magnetic recording media using these supports have a percent heat shrinkage of from 1.5 to 2.3% in the direction of maximum shrinkage upon standing at 110° C. for 4 hours.

The inventors further investigated with respect to the relation between surface roughness of a support on the side opposite to a magnetic layer and the running properties and electromagnetic properties, and found that magnetic recording media using a flexible support having a surface that is too smooth cannot provide satisfactory running properties of electromagnetic properties after repeated use.

SUMMARY OF THE INVENTION

Accordingly, a primary object of this invention is to provide a magnetic recording medium having excellent running properties after repeated use.

Another object of this invention is to provide a magnetic recording medium which undergoes little deformation due to heat shrinkage upon exposure to high temperature and keeps a stable output level during reproduction.

A further object of this invention is to provide a magnetic recording medium having a small percent heat shrinkage and excellent running properties.

A still further object of this invention is to provide a magnetic recording medium which has a small percent heat shrinkage and good dimensional stability, and causes only small shifts in frequency of recorded signals.

A yet further object of this invention is to provide a magnetic recording medium comprising a thin support, which has a small percent heat shrinkage, stable running properties, stability in output level, and dimensional stability.

As a result of extensive investigations, it has now been found that the above-described objects can be accomplished by a magnetic recording medium comprising a support having coated thereon a magnetic layer, wherein said support layer has a surface roughness (Ra) of from 0.01 to 0.1 $\mu$m on the side opposite to the magnetic layer, said magnetic recording medium has a percent heat shrinkage of 1% or less after standing at 110° C. for 4 hours and said magnetic layer contains a metal or alloy fine powder as a ferromagnetic powder.

DETAILED DESCRIPTION OF THE INVENTION

The terminology "percent heat shrinkage" as herein used means the percent heat shrinkage in the direction in which the magnetic recording medium shows its maximum percent heat shrinkage.

The terminology "surface roughness" as used herein is determined according to the procedure defined in JIS B0601 expressed in terms of center-line average roughness at a cut-off value of 0.25 mm.

The magnetic recording medium according to the present invention comprises a flexible support having coated thereon a magnetic layer and has a percent heat shrinkage of 1% or less in the direction of maximum shrinkage after standing at 110° C. for 4 hours. The surface of the support on the side opposite to the magnetic layer has a roughness (Ra) of from 0.01 to 0.1 $\mu$m, preferably from 0.02 to 0.08 $\mu$m, and more preferably from 0.03 to 0.06 $\mu$m.

In a preferred embodiment according to the present invention, the flexible support which can be used has a percent heat shrinkage of 1.8% or less, and preferably 1.5% or less, in the direction of maximum shrinkage after standing at 110° C. for 4 hours. Such a support can include a polyester film having a reduced difference in Young's modulus depending on the direction by changing stretching conditions, e.g., a polyester film having a Young's modulus of from 450 to 650 Kg/mm$^2$ in its lengthwise direction and from 450 to 550 Kg/mm$^2$ in its widthwise direction; or a polyester film having a reduced percent heat shrinkage which is obtained by heat-treating a stretched polyester film in an atmosphere at 110° C. or more; as well as a polycarbonate film, a polyamide film, a polysulfone film, a polypropylene film, a polyethersulfone film, and the like. Of these flexible supports, a polyester film is particularly preferred in view of its high Young's modulus in its longitudinal direction and its inexpensiveness.

On the other hand, the surface roughness of the support on the side opposite to the magnetic layer (i.e., on the surface of the support on the opposite side from the surface on which the magnetic layer is coated) ranges from 0.01 to 0.1 μm. Surface roughness greater than 0.1 μm tends to deteriorate the frequency characteristics.

Such a surface roughness of the support can be achieved by various methods, including addition of fine particles as exterior-protruding particles, precipitation of interior particles, and control of conditions for stretching or film formation, as disclosed in Japanese Patent Publication No. 43422/833, Japanese Patent Publication (OPI) Nos. 97508/73 and 177522/83 (the term "OPI" as used herein refers to a "published unexamined Japanese patent application").

Onto the above-described support is coated a magnetic layer containing a ferromagnetic powder, a binder, and, if desired, other additives. The magnetic recording media may further comprise a backing layer on the surface of the support opposite to the magnetic layer.

In general, when a magnetic layer is coated on the above-described support, the resulting magnetic recording medium has a percent heat shrinkage of 1% or less.

The magnetic layer which can be used in the present invention can be formed by applying a magnetic coating composition comprising an organic solvent having dispersed therein a binder composition, a metal or alloy fine powder as a ferromagnetic powder, and additives, onto the support, followed by drying.

Since the magnetic recording media according to the present invention employ a metal or alloy fine powder as a ferromagnetic powder, print-through occurring during storage at a high temperature can be reduced as compared with magnetic recording media using Co-modified iron oxide as a ferromagnetic powder, and, therefore, deterioration of sound quality can be reduced.

The ferromagnetic metal powder or alloy fine powder which can be used in the present invention generally has a metal content of not less than 75% by weight, and preferably not less than 80% by weight, with not less than 50% by weight of the metal content being iron. The metal or alloy fine powder may further contain one or more metals selected from cobalt, nickel, chromium, zinc, aluminum, manganese, etc., as described in Japanese Patent Application (OPI) No. 56508/77. The metal or alloy powder may furthermore contain hydrogen, oxygen, nitrogen, etc., as a non-metallic component. The ferromagnetic powder generally has a diameter (i.e., minimum cross-sectional distance) of from 150 to 800 Å, an acicular ratio (length/diameter) of from 3/1 to 20/1, a saturation magnetization ($\delta s$) of from 70 to 180 emu/g, a coercive force (Hc) of from 300 to 2,000 Oe, and a specific surface area (BET method, i.e., the method for determining a specific area proposed by S. Brunauer, R. H. Emmett and E. Teller in 1938) of from 30 to 60 m$^2$/g.

Details of the metal or alloy fine powders, additives, organic solvent, methods of dispersion and coating, and the like are described in Japanese Patent Application (OIP) Nos. 108804/77, 21805/79 and 46011/79, etc.

The magnetic recording medium according to the present invention have the following advantages:

(1) After repeated runs in enviroments subject to mild changes in temperature and humidity, such as in the interior of a room, the magnetic recording medium undergoes little deformation and satisfactory running properties can be obtained. In particular, even thin magnetic recording media, such as audio compact cassettes (e.g., C-80, C-90, C-120, etc.), can keep satisfactory running properties.

(2) The tape or sheet undergoes reduced deformation even at high temperatures above 100° C., and thus a stable output level can be kept.

(3) The percent heat shrinkage is so small that shifts of frequency of recorded signals can be suppressed to an aurally or visually imperceptible degree.

(4) Even when the tape wound around hubs is preserved at high temperatures of more than 100° C., a dimensional changes in the inner diameter of the hubs (due to shrinkage) can be reduced. Therefore, insertion or ejection of cassettes into or from a recording reproduction device can be smoothly effected.

(5) Even when an audio cassette tape wound around hubs is preserved at high temperatures more than 100° C., the phenomenon of hub extrusion does not take place, due to the small percent heat shrinkage of the tape, and, therefore, running disorders do not occur.

(6) Even when preserved at high temperatures above 100° C., the magnetic recording medium does not undergo deformation, and thus occurrences of stoppages of running after repeated runs can be reduced.

The present invention will now be illustrated in greater detail by reference to examples, but it should be understood that the present invention is not limited thereto. In the examples, all the parts, percents, and ratios are by weight, unless otherwise indicated.

In the following examples, performance characteristics were determined as follows:

(a) Evaluation of Solvent Resistance

Test samples were immersed in a solvent, and changes of the samples were observed after 24 hours.
A: No change was observed.
B: Slight swelling or curling occurred.
X: The tape was dissolved.

(b) Determination of Percent Heat Shrinkage

Marks were previously made on test samples at an about 10 cm interval in an atmosphere of 23° C. and 60% RH, and the interval (A) was measured by the use of a micrometer. Thereafter, tension of 0.4 g/10 mm width was imposed, and the samples were allowed to stand in an atmosphere of 110° C. for 4 hours. The samples were transferred to the initial room temperature atmosphere, and, one hour later, the interval (A') between the same two marks were measured. The percent heat shrinkage was obtained from the following equation:

$$\text{Percent Heat Shrinkage} = \frac{A - A'}{A} \times 100 \, (\%)$$

(c) Running Property, at 23° C., 60% RH

Each test sample was subjected to running test on 40 commercially available audio cassette decks to evaluate the state of winding, the state of running, and deformation of the tape.
A: Neither stoppage of running nor irregular winding was observed.
B: No stoppage of running was observed, but irregular winding occurred in 1 to 3 decks.

X: Irregular winding was observed in 4 to 6 decks, 1 to 2 decks of which stoppage of running occurred.

(d) Output Fluctuation

Tapes having recorded thereon a signal of 3 KHz at a level of 10 dB were allowed to stand in the state of being wound around hubs (tape rolls) at 110° C. for 4 hours. The tape rolls were then placed in an ambient atmosphere, and one hour later, the recorded signal was reproduced and the output fluctuation was measured.

20 tape rolls were used per sample, and the percent occurrence of output fluctuations of 6 dB or more was determined.

(e) Frequency Shift

Tapes having recorded thereon a signal of 3 KHz at a level of 10 dB were allowed to stand at 110° C. for 4 hours as being wound around hub. The tapes were then placed in an ambient atmosphere, and one hour later, the recorded signal was reproduced. The frequency of the reproduced signal was measured to obtain the percent frequency shift from the recorded signal of 3 KHz.

(f) Percent Shrinkage of Inner Diameter of Hub

An inner diameter of a hub having wound therearound the test sample tape was measured. The hub with tape was allowed to stand at 110° C. for 4 hours and then placed in an ambient temperature. After 1 hour, the inner diameter of the hub was again measured to obtain a percent shrinkage.

(g) Percent Occurrence of Hub Extrusion

A hub having wound therearound a test sample tape was allowed to stand at 110° C. for 4 hours, and whether the hub was extruded laterally was visually evaluated. 20 tape rolls were used per sample.

(h) Percent of Stoppages of Running

After standing at 110° C. for 4 hours, each cassette tape was run on 20 commercially available automobile stereo cassette decks for 24 hours at 25° C. and 50% relative humidity, and the percent of tapes where stoppage of running occurred was determined.

(i) Sensitivity

Sensitivity at a signal of 315 Hz was expressed as a relative value with respect to the standard tape, IEC IV #E912BH (produced by TDK). The sensitivity was determined using a cassette deck, Nakamichi 582 produced by Nakamichi K.K.

(j) Frequency Characteristics

The difference in output between 10 KHz and 315 Hz was determined.

Resistance of each of the supports indicated in Table 1 to ethyl acetate, methyl ethyl ketone and toluene, and the percent heat shrinkage of the same support in the direction of maximum shrinkage after standing at 110° C. for 4 hours were determined. The results obtained are shown in Table 2. In each case, the support had a thickness of 12 μm.

TABLE 1

| Sample No. | Support | Treatment of Support | Young's Modulus MD (Kg/mm$^2$) | Young's Modulus TD (Kg/mm$^2$) | Surface Roughness of Support (μm) |
|---|---|---|---|---|---|
| 1 | polyethylene terephthalate | biaxial stretching followed by stretching in longitudinal direction | 750 | 400 | 0.048 |
| 2 | polyethylene terephthalate | biaxial stretching followed by light stretching in longitudinal direction | 620 | 450 | 0.008 |
| 3 | polyethylene terephthalate | biaxial stretching followed by light stretching in longitudinal direction | " | " | 0.011 |
| 4 | polyethylene terephthalate | biaxial stretching followed by light stretching in longitudinal direction | " | " | 0.024 |
| 5 | polyethylene terephthalate | biaxial stretching followed by light stretching in longitudinal direction | " | " | 0.033 |
| 6 | polyethylene terephthalate | biaxial stretching followed by light stretching in longitudinal direction | " | " | 0.045 |
| 7 | polyethylene terephthalate | biaxial stretching followed by light stretching in longitudinal direction | " | " | 0.060 |
| 8 | polyethylene terephthalate | biaxial stretching followed by light stretching in longitudinal direction | " | " | 0.080 |
| 9 | polyethylene terephthalate | biaxial stretching followed by light stretching in longitudinal direction | " | " | 0.112 |
| 10 | polyethylene terephthalate | biaxial stretching at an equal ratio | 500 | 500 | 0.015 |
| 11 | polyethylene terephthalate | biaxial stretching at an equal ratio | " | " | 0.037 |
| 12 | polyethylene terephthalate | biaxial stretching at an equal ratio | " | " | 0.058 |
| 13 | polyethylene terephthalate | biaxial stretching at an equal ratio | " | " | 0.082 |
| 14 | polyethylene terephthalate | biaxial stretching followed by stretching in longitudinal direction, heat treatment at 110° C. | — | — | 0.041 |
| 15 | polycarbonate | — | — | — | 0.022 |

TABLE 1-continued

| Sample No. | Support | Treatment of Support | Young's Modulus MD (Kg/mm²) | Young's Modulus TD (Kg/mm²) | Surface Roughness of Support (μm) |
|---|---|---|---|---|---|
| 16 | polyamide | — | — | — | 0.025 |

Note:
1. The support of Sample No. 6 was prepared by biaxially stretching a polyethylene terephthalate film in a molten state at a stretching ratio of 3.5 times and, after fixing by heating, further stretching in a longitudinal direction at a stretching ratio of 1.5 times.
2. The support of Sample No. 7 was prepared by biaxially stretching a polyethylene terephthalate film in a molten state at a stretching ratio of 3.5 times and, after fixing by heating, further stretching in a longitudinal direction at a stretching ratio of 1.15 times.
3. The support of Sample No. 8 was prepared by biaxially stretching a polyethylene terephthalate film in a molten state at a stretching ratio of 3.5 times and then fixing by heating.
4. The support of Sample No. 9 was prepared by heat-treating (at 110° C.) the support prepared under the same conditions as those of Sample No. 6.

TABLE 2

| Sample No. | Solvent Resistance Ethyl Acetate | Methyl Ethyl Ketone | Toluene | Percent Heat Shrinkage (%) |
|---|---|---|---|---|
| 1 | A | A | A | 4.31 |
| 2 | A | A | A | 1.03 |
| 3 | A | A | A | 1.02 |
| 4 | A | A | A | 1.02 |
| 5 | A | A | A | 1.03 |
| 6 | A | A | A | 1.04 |
| 7 | A | A | A | 1.03 |
| 8 | A | A | A | 1.02 |
| 9 | A | A | A | 1.04 |
| 10 | A | A | A | 1.44 |
| 11 | A | A | A | 1.45 |
| 12 | A | A | A | 1.42 |
| 13 | A | A | A | 1.45 |
| 14 | A | A | A | 0.55 |
| 15 | B | B | B | 0.83 |
| 16 | A | A | A | 0.30 |

Tables 1 and 2 above show that Sample Nos. 2 to 14 and 16 were satisfactory because of their small percents of heat shrinkage and solvent resistance, although Sample No. 14 was slightly inferior in solvent resistance in spite of its small percent heat shrinkage. Sample No. 1 had a great percent heat shrinkage.

EXAMPLE 1

| Fe—Zn alloy fine powder (Fe/Zn = 95:5; coercive force (HC) = 1300 Oe; acicular | 100 parts |
|---|---|
| ratio = 10/1; average longer diameter = 0.3 μm) | |
| Vinyl chloride-vinyl acetate-vinyl alcohol copolymer (90:3:7; polymerization degree = ca. 400) | 20 parts |
| Thermoplastic polyurethane resin | 5 parts |
| Carbon black | 2 parts |
| Oleic acid | 2 parts |
| Dimethylpolysiloxane (polymerization degree = ca. 60) | 1 parts |
| α-Alumina | 0.2 parts |
| Butyl acetate | 280 parts |

The above components were kneaded and dispersed for 3 hours using a batch system sand grinder, and the dispersion was filtered using a filter having an average pore size of 1 μm. The resulting magnetic coating composition was applied onto each of the supports (Sample Nos. 1 to 16) by reverse roll coating, to provide a dry thickness of 5 μm. While the magnetic coating was still wet, the magnetic particles in the coated layer were subjected to orientation with a cobalt magnet having a magnetization force of 3,500 Gauss, followed by drying. After the drying, the surface of the magnetic layer was made smooth by passing it through supercalender rolls. The resulting medium was slit into a 3.81 mm width to prepare a magnetic tape, and the tape, of 90 m length, was loaded in an audio compact cassette. Performance characteristics of each of the resulting audio compact cassette tapes (Sample Nos. 1' to 16') were determined according to the above-described methods, and the results obtained are shown in Table 3.

TABLE 3

| Sample No. | (c)*1 | Electromagnetic Property (i)*2 | (j)*3 | (b)*4 (%) | (d)*5 (%) | (e)*6 (%) | (b)*7 (%) | (g)*8 (%) | (f)*9 (%) | Ra*10 (μm) |
|---|---|---|---|---|---|---|---|---|---|---|
| 1' | A | +0.8 | +1.0 | 2.32 | 70 | 0.50 | 40 | 40 | 5.4 | 0.048 |
| 2' | X | +0.7 | +1.8 | 0.67 | 0 | 0.10 | 15 | 0 | 1.6 | 0.008 |
| 3' | B | +0.7 | +1.6 | 0.68 | 0 | 0.10 | 0 | 0 | 1.8 | 0.011 |
| 4' | A | +0.8 | +1.5 | 0.66 | 0 | 0.10 | 0 | 0 | 1.8 | 0.024 |
| 5' | A | +0.8 | +1.2 | 0.67 | 0 | 0.10 | 0 | 0 | 1.8 | 0.033 |
| 6' | A | +0.7 | +1.0 | 0.67 | 0 | 0.10 | 0 | 0 | 1.8 | 0.045 |
| 7' | A | +0.8 | +0.8 | 0.65 | 0 | 0.10 | 0 | 0 | 1.8 | 0.060 |
| 8' | A | +0.8 | +0.7 | 0.66 | 0 | 0.10 | 0 | 0 | 1.8 | 0.080 |
| 9' | A | +0.8 | +0.5 | 0.65 | 0 | 0.10 | 0 | 0 | 1.8 | 0.112 |
| 10' | B | +0.8 | +1.5 | 0.97 | 0 | 0.11 | 0 | 0 | 1.7 | 0.015 |
| 11' | A | +0.7 | +1.1 | 0.98 | 0 | 0.11 | 0 | 0 | 2.0 | 0.037 |
| 12' | A | +0.7 | +0.8 | 0.98 | 0 | 0.11 | 0 | 0 | 2.1 | 0.058 |
| 13' | A | +0.8 | +0.7 | 0.98 | 0 | 0.11 | 0 | 0 | 2.1 | 0.082 |
| 14' | A | +0.7 | +1.1 | 0.35 | 0 | 0.06 | 0 | 0 | 1.3 | 0.041 |
| 15' | A | +0.7 | +1.5 | 0.78 | 0 | 0.14 | 0 | 0 | 1.8 | 0.022 |

TABLE 3-continued

| Sample No. | (c)*1 | Electromagnetic Property | | (b)*4 (%) | (d)*5 (%) | (e)*6 (%) | (b)*7 (%) | (g)*8 (%) | (f)*9 (%) | Ra*10 (μm) |
| --- | --- | --- | --- | --- | --- | --- | --- | --- | --- | --- |
| | | (i)*2 | (j)*3 | | | | | | | |
| 16' | A | +0.7 | +1.5 | 0.20 | 0 | 0.05 | 0 | 0 | 1.0 | 0.025 |

Note:
*1Running property at 23° C. and 60% RH
*2Sensitivity
*3Frequency characteristics
*4Percent heat shrinkage of tape after standing at 110° C. for 4 hours
*5Percent occurrence of output fluctuation of 6 dB or more after standing at 110° C. for 4 hours
*6Shift in frequency after standing at 110° C. for 4 hours
*7Percent stoppages of running after standing at 110° C. for 4 hours
*8Percent occurrence of hub extrusion after standing at 110° C. for 4 hours
*9Percent shrinkage of hub's inner diameter after standing at 110° C. for 4 hours
*10Surface roughness of support on the side opposite to the magnetic layer.

It can be seen from Tables 2 to 3 that Sample Nos. 3' to 16' wherein Sample Nos. 3 to 16 having a small percent heat shrinkage and a large surface roughness (Ra) were used as support, respectively, showed a good running property in an atmosphere of 23° C. and 60% RH and a small variation in output level, a small shift of frequency, a small percent shrinkage of the hub and a good running property after standing at 110° C. for 4 hours in each case. However, a support having a surface roughness that is too high, such as Sample No. 9 rises on the surface of the magnetic layer to increase the surface roughness of the magnetic layer, thereby decreasing the frequency characteristics of the magnetic recording medium (Sample No. 9'). Therefore, the preferred among Sample Nos. 1' to 16' are Sample Nos. 3' to 8' and 10' to 16', and the more preferred are Sample Nos. 4' to 7', 11', 12' and 14' to 16'.

When Sample No. 1', which is a conventional magnetic recording medium, was exposed to high temperatures, the fluctuation in output, shift in frequency and percent shrinkage of hub's inner diameter became large due to its high percent heat shrinkage; furthermore, the percent of hub extrusion and the percent stoppages of running were also high. Therefore, Sample No. 1' cannot fulfill the objects of the present invention.

EXAMPLE 2

A magnetic coating composition having the same composition as described in Example 1 was applied onto each of 7 μm thick Support Sample Nos. 17 to 32 as indicated in Table 4 by reverse roll coating to a dry thickness of 5 μm. Thereafter, the resulting samples were treated in the same manner as in Example 1 to prepare audio cassette tapes of 12 μm thickness and 3.81 mm width.

Each sample tape of 135 m length was placed in an audio compact cassette. Performance characteristics of the resulting audio compact cassettes were determined in the same manner as in Example 1, and the results obtained are shown in Table 5.

TABLE 4

| Sample No. | Support | Treatment of Support | Young's Modulus | | Percent Heat Shrinkage Upon Standing at 110° C. for 4 Hrs. (%) | Surface Roughness of Support (μm) |
| --- | --- | --- | --- | --- | --- | --- |
| | | | MD (Kg/mm²) | TD (Kg/mm²) | | |
| 17 | polyethylene terephthalate | biaxial stretching followed by stretching in longitudinal direction | 750 | 400 | 3.53 | 0.046 |
| 18 | polyethylene terephthalate | biaxial stretching followed by light stretching in longitudinal direction | 620 | 450 | 0.94 | 0.008 |
| 19 | polyethylene terephthalate | biaxial stretching followed by light stretching in longitudinal direction | " | " | 0.93 | 0.013 |
| 20 | polyethylene terephthalate | biaxial stretching followed by light stretching in longitudinal direction | " | " | 0.94 | 0.024 |
| 21 | polyethylene terephthalate | biaxial stretching followed by light stretching in longitudinal direction | " | " | 0.94 | 0.035 |
| 22 | polyethylene terephthalate | biaxial stretching followed by light stretching in longitudinal direction | " | " | 0.93 | 0.046 |
| 23 | polyethylene terephthalate | biaxial stretching followed by light stretching in longitudinal direction | " | " | 0.95 | 0.059 |
| 24 | polyethylene terephthalate | biaxial stretching followed by light stretching in longitudinal direction | " | " | 0.94 | 0.081 |
| 25 | polyethylene terephthalate | biaxial stretching followed by light stretching in longitudinal direction | " | " | 0.94 | 0.114 |
| 26 | polyethylene terephthalate | biaxial stretching at an equal ratio | 500 | 500 | 1.17 | 0.013 |
| 27 | polyethylene terephthalate | biaxial stretching at an equal ratio | " | " | 1.18 | 0.037 |
| 28 | polyethylene | biaxial stretching at an equal | " | " | 1.17 | 0.060 |

TABLE 4-continued

| Sample No. | Support | Treatment of Support | Young's Modulus MD (Kg/mm$^2$) | Young's Modulus TD (Kg/mm$^2$) | Percent Heat Shrinkage Upon Standing at 110° C. for 4 Hrs. (%) | Surface Roughness of Support (μm) |
| --- | --- | --- | --- | --- | --- | --- |
| 29 | terephthalate polyethylene terephthalate | ratio biaxial stretching followed by stretching in longitudinal direction, heat treatment at 110° C. | — | — | 0.50 | 0.041 |
| 30 | polycarbonate | — | — | — | 0.61 | 0.023 |
| 31 | polyamide | — | — | — | 0.20 | 0.025 |

TABLE 5

| Sample No. | (c)*1 | Electromagnetic Property (i)*2 | Electromagnetic Property (j)*3 | (b)*4 (%) | (d)*5 (%) | (e)*6 (%) | (b)*7 (%) | (g)*8 (%) | (f)*9 (%) | Ra*10 (μm) |
| --- | --- | --- | --- | --- | --- | --- | --- | --- | --- | --- |
| 17' | A | 0.7 | 1.0 | 1.99 | 70 | 0.40 | 60 | 65 | 5.8 | 0.046 |
| 18' | X | 0.8 | 2.1 | 0.56 | 0 | 0.08 | 25 | 0 | 1.7 | 0.008 |
| 19' | B | 0.8 | 1.8 | 0.55 | 0 | 0.08 | 10 | 0 | 1.6 | 0.013 |
| 20' | B | 0.7 | 1.5 | 0.56 | 0 | 0.08 | 0 | 0 | 1.6 | 0.024 |
| 21' | A | 0.7 | 1.3 | 0.56 | 0 | 0.08 | 0 | 0 | 1.7 | 0.035 |
| 22' | A | 0.7 | 1.0 | 0.56 | 0 | 0.08 | 0 | 0 | 1.7 | 0.046 |
| 23' | A | 0.7 | 0.8 | 0.55 | 0 | 0.07 | 0 | 0 | 1.6 | 0.059 |
| 24' | A | 0.6 | 0.6 | 0.57 | 0 | 0.08 | 0 | 0 | 1.8 | 0.081 |
| 25' | A | 0.5 | 0.5 | 0.56 | 0 | 0.07 | 0 | 0 | 1.7 | 0.114 |
| 26' | B | 0.7 | 1.9 | 0.77 | 0 | 0.09 | 10 | 0 | 2.1 | 0.013 |
| 27' | A | 0.7 | 1.3 | 0.78 | 0 | 0.09 | 0 | 0 | 2.0 | 0.037 |
| 28' | A | 0.7 | 0.8 | 0.78 | 0 | 0.09 | 0 | 0 | 2.0 | 0.060 |
| 29' | A | 0.7 | 0.6 | 0.79 | 0 | 0.09 | 0 | 0 | 2.0 | 0.080 |
| 30' | A | 0.8 | 1.2 | 0.26 | 0 | 0.06 | 0 | 0 | 1.5 | 0.041 |
| 31' | B | 0.6 | 1.5 | 0.42 | 0 | 0.12 | 0 | 0 | 1.8 | 0.023 |
| 32' | B | 0.7 | 1.5 | 0.10 | 0 | 0.04 | 0 | 0 | 1.0 | 0.025 |

Notes:
*1 to *10The same as in Table 3.

As can be seen from Tables 4 and 5 above, Sample Nos. 20' to 25' and 27' to 32' in which Sample Nos. 20 to 25 and 27 to 32 having a small percent heat shrinkage and a large surface roughness (Ra) were used as supports, respectively, had a satisfactory running property at 23° C. and 60% RH, a small variation in output level, a small shift in frequency, a small percent shrinkage of the inner diameter of the hub and a good running property after standing at 110° C. for 4 hours in each case. However, when the surface roughness (Ra) of the support is excessively high as in Sample No. 25', the roughness of the support increases the surface roughness of the magnetic layer thereby adversely affecting the frequency characteristics of the tape.

Accordingly, the preferred among Sample Nos. 1' to 32' are Sample Nos. 20' to 24' and 27' to 32', and more preferred are Sample Nos. 21' to 23' and 27' to 30'. Sample No. 17' that is a conventional magnetic recording medium could not fulfill the objects of the present invention similarly to Sample No. 1' in Example 1. Comparison between Sample No. 1' in Example 1 and Sample No. 17' in Example 2 revealed that Sample No. 17' having a smaller thickness was inferior to Sample No. 1' in terms of output fluctuation, percent stoppages of running, percent hub extrusion, and percent shrinkage of inner diameter of hub after standing at 110° C. for 4 hours. The deterioration in these performance characteristics was due to an increase of the time of winding around a hub, since Sample No. 1' was a wound tape prepared from 95 m of magnetic recording tape having a total thickness of 17μ, whereas Sample No. 17' was a wound tape prepared from 135 m of magnetic recording tape having a total thickness of 12μ.

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a flexible support having coated thereon a magnetic layer comprising a non-curable binder, wherein said support has a center line average surface roughness at a cut-off value of 0.25 mm of from 0.01 to 0.1 μm on the side opposite to the magnetic layer, said magnetic recording medium has a percent heat shrinkage of 1% or less in the direction of maximum shrinkage thereof after standing at 110° C. for 4 hours, and said magnetic layer contains a metal or alloy fine powder having a metal content of 75% by weight or more, wherein not less than 50% by weight of said metal content is iron and having a $S_{DET}$ surface area of from 30 to 60 m$^2$/g as a ferromagnetic powder.

2. A magnetic recorder medium as in claim 1, wherein said support has a surface roughness of from 0.02 to 0.08 μm on the side opposite to the magnetic layer.

3. A magnetic recording medium as in claim 2, wherein said support has a surface roughness of from 0.03 to 0.06 μm on the side opposite to the magnetic layer.

4. A magnetic recording medium as in claim 1, wherein said magnetic recording medium has a percent heat shrinkage of 0.8% or less in the direction of maximum shrinkage thereof after standing at 110° C. for 4 hours.

5. A magnetic recording medium as in claim 1, wherein said support has a percent heat shrinkage of 1.8% or less in the direction of maximum shrinkage thereof after standing at 110° C. for 4 hours.

6. A magnetic recording medium as in claim 5, wherein said support has a percent heat shrinkage of 1.5% or less in the direction of maximum shrinkage thereof after standing at 110° C. for 4 hours.

7. A magnetic recording medium as in claim 5, wherein said support is a polyester film having a Young's modulus of from 450 to 650 Kg/mm$^2$ in its lengthwise direction and from 450 to 550 Kg/mm$^2$ in its widthwise direction.

8. A magnetic recording medium as in claim 5, wherein said support is a polyester film having a reduced percent heat shrinkage which is obtained by heat treating a stretched polyester film at 110° C.

9. A magnetic recording medium as in claim 1, wherein said metal or alloy fine powder has a metal content of 80% by weight or more.

10. A magnetic recording medium as in claim 9, wherein not less than 50% by weight of said metal content is iron.

11. A magnetic recording medium as in claim 1, wherein said support has a surface roughness of from 0.02 to 0.08 $\mu$m on the side opposite to the magnetic layer, said magnetic recording medium has a percent heat shrinkage of 0.8% or less in the direction of maximum shrinkage thereof after standing at 110° C. for 4 hours, and said metal or alloy fine powder has a metal content of 75% by weight or more.

12. A magnetic recording medium as in claim 11, wherein said support has a percent heat shrinkage of 1.8% or less in the direction of maximum shrinkage thereof after standing at 110° C. for 4 hours.

13. A magnetic recording medium as in claim 11, wherein not less than 50% by weight of said metal content is iron.

14. A magnetic recording medium as in claim 11, wherein said support has a surface roughness of from 0.03 to 0.06 $\mu$m on the side opposite to the magnetic layer.

15. A magnetic recording medium as in claim 14, wherein said metal or alloy fine powder has a metal content of 80% by weight or more.

16. A magnetic recording medium as in claim 15, wherein said support has a percent heat shrinkage of 1.5% or less in the direction of maximum shrinkage thereof after standing at 110° C. for 4 hours.

17. A magnetic recording medium as in claim 15, wherein not less than 50% by weight of said metal content is iron.

* * * * *